United States Patent

Separautzki et al.

[11] Patent Number: 6,152,351
[45] Date of Patent: Nov. 28, 2000

[54] PROCESS FOR MANUFACTURING A WHEEL FOR A MOTOR VEHICLE

[75] Inventors: Reinhold Separautzki, Moeglingen; Jens Stach, Heimsheim; Karel Mazac, Friedberg; Walter Weh, Jettingen, all of Germany

[73] Assignees: Dr. Ing. h.c.F. Porsche AG, Weissach; KUKA Schweissanlagen + Roboter GmbH, Augsburg, both of Germany

[21] Appl. No.: 09/122,788

[22] Filed: Jul. 27, 1998

[30] Foreign Application Priority Data

Jul. 25, 1997 [DE] Germany ............................. 197 32 076

[51] Int. Cl.[7] ........................... B23K 20/12; B23K 31/02; B21D 39/00
[52] U.S. Cl. ........................... 228/114; 228/144; 228/149; 228/150
[58] Field of Search ..................... 228/144, 150, 228/149, 151, 164, 114

[56] References Cited

U.S. PATENT DOCUMENTS

| | | | |
|---|---|---|---|
| 3,462,826 | 8/1969 | Farmer et al. | 29/487 |
| 3,842,475 | 10/1974 | Clasper et al. | 29/159 R |
| 4,387,844 | 6/1983 | Frank | 228/113 |
| 4,735,353 | 4/1988 | Thomson et al. | 228/112 |
| 4,811,887 | 3/1989 | King et al. | 228/2 |
| 5,380,071 | 1/1995 | Kier, Jr. | 301/63.1 |
| 5,533,260 | 7/1996 | Kier, Jr. | 29/894.322 |
| 5,538,329 | 7/1996 | Stach | 301/65 |
| 5,548,896 | 8/1996 | Archibald et al. | 29/894.322 |
| 5,641,208 | 6/1997 | Stach | 301/64.1 |
| 5,718,485 | 2/1998 | Stach | 301/63.1 |
| 5,803,553 | 9/1998 | Wei | 301/63.1 |
| 5,829,137 | 11/1998 | Grassi | 29/894.323 |
| 5,918,947 | 7/1999 | Stach et al. | 301/65 |

FOREIGN PATENT DOCUMENTS

| | | |
|---|---|---|
| 44 30 489 | of 0000 | Germany . |
| 91 16 400 | 10/1992 | Germany . |
| 44 35 666 | 2/1996 | Germany . |
| 195 43 771 | 5/1997 | Germany . |

OTHER PUBLICATIONS

Yashan, D., et al., "Intertia Friction Welding of 1100 Aluminum to Type 316 Stainless Steel", Welding Journal, Aug. 1987, pp. 27–37.

Benninghoff, Hanns, "Fuegen mit fast allen Werkstoffen", TR Transfer, Nr. 14, 1995, pp. 22–25.

Ambroziak, Andrzej, "Fachbeitraege, Reibschweissen von Werkstoffpaarungen mit Sondermetallen", Schweissen und Schneiden 42, 1990, pp. 67–72.

*Primary Examiner*—Patrick Ryan
*Assistant Examiner*—Zidia T. Pittman
*Attorney, Agent, or Firm*—Evenson, Mckeown, Edwards & Lenahan, P.L.L.C.

[57] ABSTRACT

A process for manufacturing a wheel for a motor vehicle, in which a wheel spider and a rim ring are connected with one another by means of friction welding. At least one of these wheel parts consists of a magnesium alloy. The controlling of the speed of the start of the friction, of the friction and of the compression of the friction welding process, particularly of the deformation capacity, takes place as a function of physical characteristics of the magnesium alloy.

18 Claims, 1 Drawing Sheet

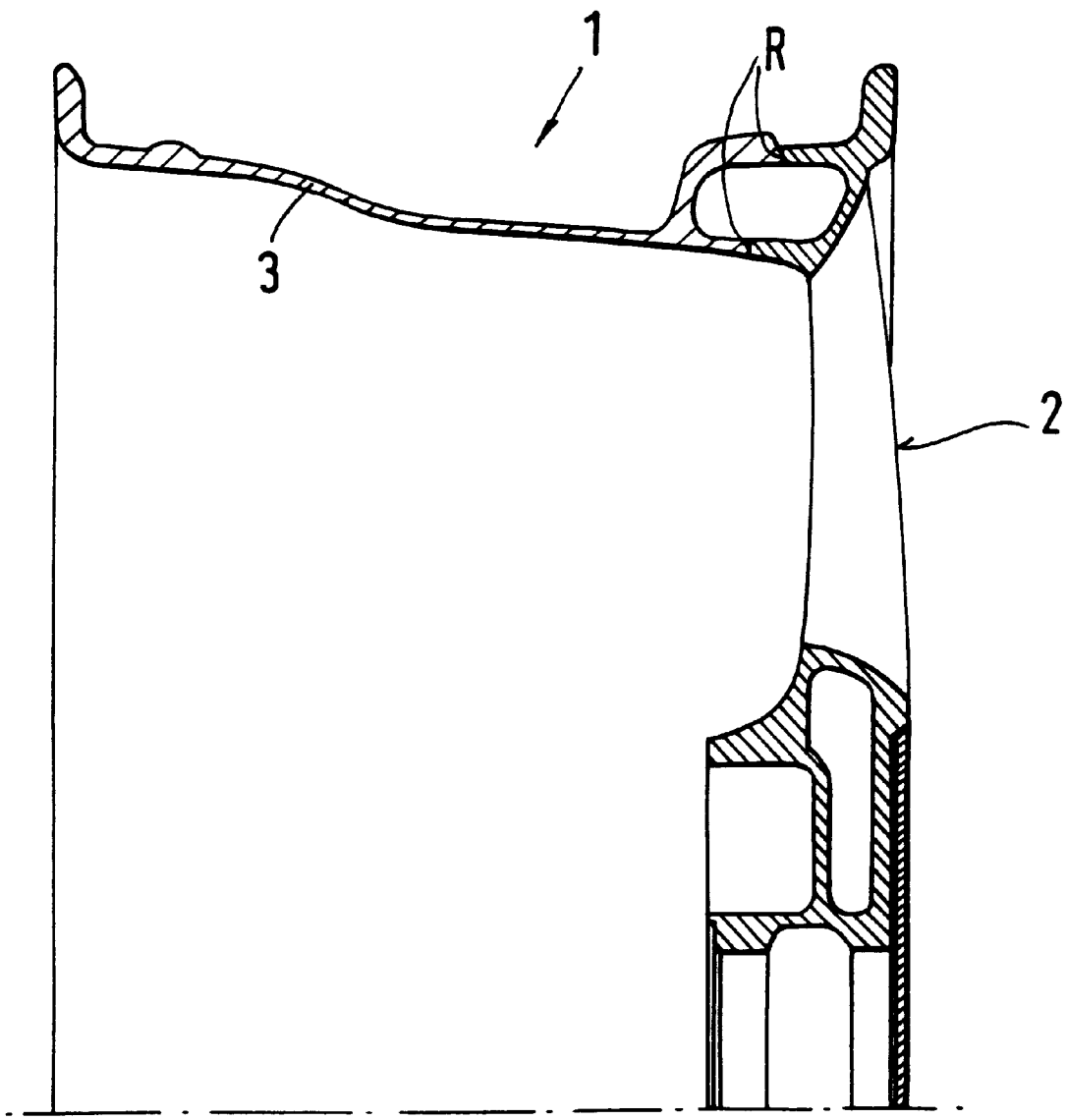

PROCESS FOR MANUFACTURING A WHEEL FOR A MOTOR VEHICLE

BACKGROUND AND SUMMARY OF THE INVENTION

This application claims the priority of German patent document 197 32 076.7, filed Jul. 25, 1997, the disclosure of which is expressly incorporated by reference herein.

The invention relates to a process for manufacturing a wheel for a motor vehicle by means of friction welding.

From German Patent Document DE-A-44 35 666, a vehicle wheel made of light metal is known which consists of a wheel spider and a rim ring which are connected with one another by means of friction welding. In this case, the wheel spider and/or the rim ring may consist of a magnesium alloy. In practice, it was found that the wheel parts made of a magnesium alloy cannot easily be friction welded. The friction welding parameters, which otherwise apply to light-metal alloys, particularly to aluminum alloys, cannot be transferred to magnesium alloys, at least not while achieving the desired high strengths and reliabilities of the friction welded connection.

It is therefore an object of the present invention to provide a suitable manufacturing process for the friction welding of such wheel parts, of which at least one consists of a magnesium alloy.

This and other objects have been achieved according to the present invention by providing a process for manufacturing a wheel for a motor vehicle, in which a wheel spider and a rim ring are connected with one another by friction welding and at least one of said wheel spider and said rim ring is made of a magnesium alloy, wherein the controlling of the speed of the initial friction, of the friction and of the compression, of the friction welding process takes place as a function of physical characteristics of the magnesium alloy.

According to the invention, the speed of the start of the friction, the frictional speed and compression (upsetting) speed are controlled according to the physical characteristics of the magnesium alloy. These physical characteristics particularly relate to the deformation capacity of the respective aluminum alloy but also to other physical characteristics, such as the melting point, the thermal conductivity, the specific heat or the like. Within dissimilar pairings of material, for example, between an aluminum alloy and a magnesium alloy, the magnesium alloy with its requirements therefore determines the friction welding parameters to be set. In the case of similar pairings of material between two different magnesium alloys, the friction welding parameters are determined by the physical characteristics of the lower-deforming alloys or of the alloy which has the higher melting point and/or the higher thermal conductivity and/or the higher specific heat. According to this process, the components can be friction welded with a high reliability and connection strength. In particular, cracks are avoided on the friction welding connection seams, particularly the outside seam. In addition, generally high stability values are achieved which are uniform on the wheel circumference.

As an alternative to or in combination with the above-mentioned process steps, the required friction welding quality is also achieved by a preheating or additional heating of the wheel part during the friction welding process. This is particularly important for compensating different deformation capacities of the participating magnesium alloy(s). In this case, a heated inert gas may be used for the heating, which has the additional favorable effect that the friction welding area is shielded and oxidation problems, in particular, are avoided.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic sectional view of a cross-section of a vehicle wheel made according to a preferred embodiment of the present invention.

DETAILED DESCRIPTION OF THE DRAWINGS

In its shape, the illustrated wheel corresponds to that known from German Patent Document DE-A-44 35 666. However, it may also have any different suitable shape. The wheel 1 consists of a wheel spider 2, which preferably comprises hollow spokes, and of a rim ring 3. The wheel spider 2 may consist of a cast part and the rim ring 3 may consist of a cast part which was further treated my means of a pressing process. The two wheel parts 2, 3 are connected with one another by way of a friction welded connection R.

At least one of the two wheel parts 2, 3 consists of a magnesium alloy. Preferably, at least the rim ring 3 consists of such a magnesium alloy. For reasons of a protection against corrosion, the wheel spider 2 may, for example, be made of an aluminum alloy. In addition, arbitrary other suitable pairings of material with the magnesium alloy are contemplated. Wheel parts of the same magnesium alloy must also be connected with one another. Furthermore, wheel parts made of different magnesium alloys can also be connected.

In a particularly preferred embodiment, both wheel parts 2, 3 consist of a magnesium alloy, in which case, however, different alloy compositions are used. In one preferred embodiment, the rim ring 3 consists of an AM60 magnesium alloy and the wheel spider 2 consists of an AE42 magnesium alloy. By means of the other preferred variant, an AM60 magnesium alloy is also suggested for the rim ring 3 and an AZ91 magnesium alloy is suggested for the wheel spider 2. Furthermore, it is advantageous for the wheel spider 2 to consist of an AZ91 alloy and for the rim ring 3 to consist of an AE42 alloy. The AZ91 alloy permits fine-grain structures and has a relatively high resistance to pressure of 160 $N/mm^2$ with a low elongation at rupture of 3%. The AM60 alloy has a larger elongation at rupture of 8% with a lower resistance to pressure of 130 $N/mm^2$. The AE42 alloy offers an elongation at rupture of 10% with a resistance to pressure of 145 $N/mm^2$.

The wheel parts 2, 3 are clamped into a friction welding machine (not shown) and are friction welded to one another. The friction welding machine offers a precisely adjustable rotational speed band and has a device for controlling and optionally also monitoring the angle of rotation. Such a friction welding device is indicated, for example, in German Patent Document DE-C-196 23 240.

The control of the initial frictional, the frictional and the compression speed of the friction welding process or of the friction welding machine takes place as a function of the physical characteristics of the magnesium alloy. In the case of a dissimilar pairing of materials between a magnesium alloy and another material, the parameters are determined by the magnesium alloy. In the case of a pairing of materials with two magnesium alloys, the alloy with the lower deformation capacity is determining.

The decisive physical characteristics are of a different types. The parameters are primarily based on the deformation capacity of the decisive magnesium alloy. However, a higher melting point and/or a higher thermal conductivity and/or a higher specific heat of the determining magnesium alloy are also controlling.

During the friction welding process, it is recommended to set the rotational speed during the start of the friction operation and during the friction operation in range of between 500 and 100 r.p.m. In this case, the angle of rotation is controlled and monitored at the start of the friction operation and during the friction operation. The friction welding can also take place by means of a chemical fluxing agent which contains no acid.

The compression (upsetting) stroke depends on the determining magnesium alloy. With respect to the force and the path, it is adjusted such that the component shortening corresponds approximately to the wall thickness of the wheel parts 2, 3. In practice, good results were obtained with a component shortening of 4 to 8 mm, preferably 4 to 5 mm.

In this case, the speed of the compression stroke is also controlled if there is a dissimilar pairing of materials as a function of the deformation capacity of the magnesium alloy. In the case of similar pairings of materials of two magnesium alloys, the speed of the compression stroke is determined by the deformation of that magnesium alloy which has the lower deformation capacity. The speed of the compression stroke should be as low as possible. It is lower than the speed which is customary in the case of other light-metal alloys, for example, aluminum alloys.

The compression stroke preferably takes place at a constant compression force. In the case of a hydraulic compression drive, the oil quantity is kept constant for this purpose. However, the rate of oil flow is controlled for influencing the compression speed. This takes place by way of an adjustable throttle in the friction welding machine. In a preferred embodiment, the throttle adjustment remains constant during the friction welding process. However, it changes with an exchange of the component types and/or of the pairings of materials and/or other marginal conditions.

It is recommended to maintain an overall welding time for the start of the friction operation, the friction operation and the compression between 0.5 and 1.5 sec. during the friction welding process.

As an additional or alternative measure for influencing the friction welded connection in the direction of a higher and more uniform strength, it is preferable to preheat one of the wheel parts 2, 3 before the friction welding operation and/or to additionally heat it during the friction welding operation. In the case of dissimilar pairings of material with a magnesium alloy, the wheel part 2, 3 made of the magnesium alloy is heated. When two different magnesium alloys are used, that wheel part made of the magnesium alloy which has the lower deformation capacity and/or the higher melting point and/or the higher thermal conductivity and/or the higher specific heat is preheated and/or additionally heated. This heating is controlled to approximately 40 to 50° C. A wider range to 150° is also contemplated under special circumstances.

The preheating or additional heating can take place in various suitable manners. In the preferred embodiment, a heated inert gas is used which is aimed at the wheel part 2, 3 to be heated. It is recommended to direct the impinging point of the inert gas blowing jet relatively closely to the wheel part edge and of the friction welding point. As an alternative, the heating can take place by an inductive heating instead of inert gas. The inductive heating is carried out at the stationary part of the wheel which is held in an axially movable carriage of the friction welding machine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for manufacturing a wheel for a motor vehicle by friction-welding of a wheel spider and rim ring together, at least one of said wheel spider and rim ring being made of a magnesium alloy, comprising controlling said friction-welding as a function of physical characteristics of the magnesium alloy as follows:
   (i) initiating friction-welding with a relative rotational speed of said spider and rim ring of between 500 and 1000 rpm, and
   (ii) controlling a path of compression stroke of said spider and rim ring during friction-welding to result in a component shortening of between 4–8 mm.

2. Process according to claim 1, wherein, with respect to the force and the path, the compression stroke is set such that the component shortening corresponds approximately to a wall thickness of the wheel spider and rim ring being welded together.

3. Process according to claim 2, wherein the component shortening amounts to 4 to 5 mm.

4. Process according to claim 1, wherein the overall welding time is between 0.5 and 1.5 sec.

5. Process according to claim 1, wherein the angle of rotation is controlled and monitored during the start of the friction-welding and during the friction-welding.

6. Process according to claim 1, wherein, in the case of dissimilar pairings of material of the wheel spider and rim, the speed of the compression stroke is controlled as a function of the deformation of the magnesium alloy.

7. Process according to claim 1, wherein, in the case of similar pairings of material of the wheel spider and rim, the speed of the compression stroke is controlled as a function of the deformation of the lower-deforming magnesium alloy.

8. Process according to claim 1, wherein at least one of the wheel spider and rim is preheated before or during the friction welding operation and/or is additionally heated.

9. Process according to claim 8, wherein the one of the spider and rim made of a material with at least one of a higher melting point a higher thermal conductivity and a higher specific heat is preheated and/or additionally heated.

10. Process according to claim 8, wherein the wheel part is heated by 40 to 50° C.

11. Process according to claim 8, wherein the heating takes place by means of a heated inert gas.

12. Process according to claim 8, wherein the heating takes place by inductive heating.

13. Process according to claim 1, wherein the wheel parts are manufactured of two different magnesium alloys.

14. Process according to claim 13, wherein the wheel spider is made of an AE42 magnesium alloy and the rim ring is made of an AM60 magnesium alloy.

15. Process according to claim 13, wherein the wheel spider is made of an AM60 magnesium alloy and the rim ring is made of an AZ91 magnesium alloy.

16. Process according to claim 13, wherein the wheel spider is made of an AZ91 magnesium alloy and the rim ring is made of an AE42 magnesium alloy.

17. Process according to claim 1, wherein the welding takes place by means of a chemical fluxing agent which contains no acid.

18. A wheel made according to the process of claim 1.

* * * * *